April 26, 1932. R. W. HEMPEL 1,855,630
HOLDER FOR GARDEN HOSE NOZZLES
Filed Dec. 8, 1930 2 Sheets-Sheet 1
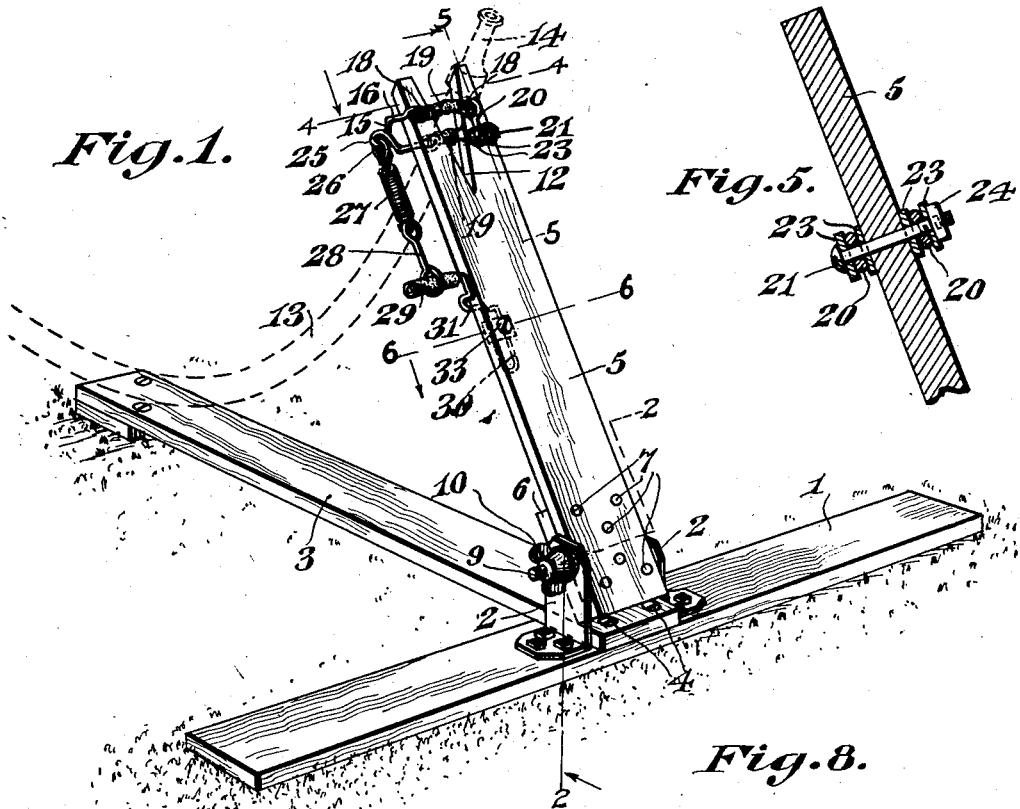
Inventor
Richard W. Hempel,
By
Attorney

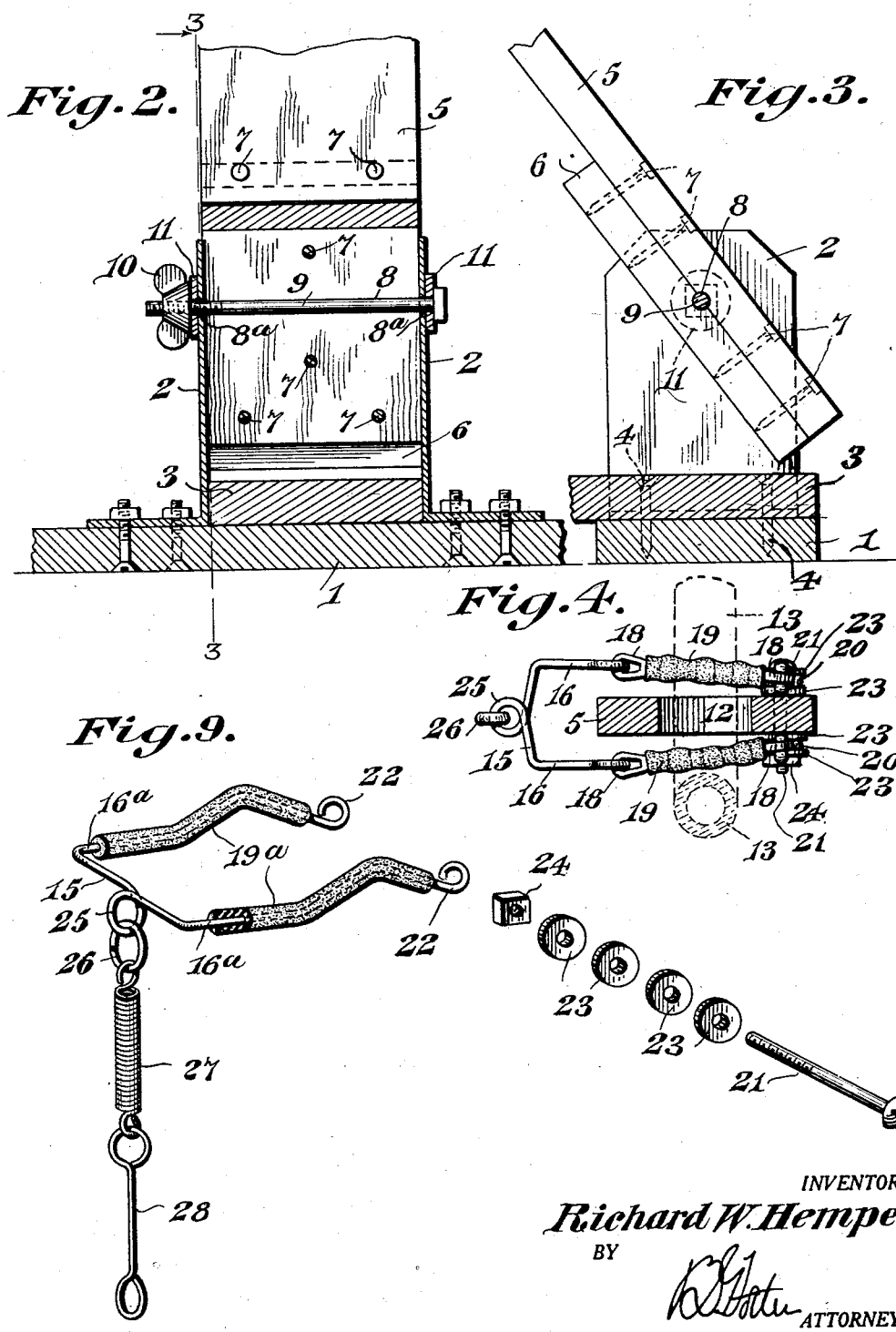

Patented Apr. 26, 1932

1,855,630

UNITED STATES PATENT OFFICE

RICHARD W. HEMPEL, OF NORTH TONAWANDA, NEW YORK

HOLDER FOR GARDEN HOSE NOZZLES

Application filed December 8, 1930. Serial No. 500,345.

The object of the present invention is to provide a simple, durable and inexpensive device to hold a garden hose in a position to sprinkle a lawn.

A further object is to provide such a novel device for this purpose that is adjustable so that the water from the hose will be delivered at any desired angle.

In the accompanying drawings:

Figure 1 is a perspective view of the device showing its manner of use.

Figure 2 is a cross sectional view on line 2—2 of Figure 1.

Figure 3 is a cross sectional view on line 3—3 of Figure 2.

Figure 4 is a cross sectional view on the line 4—4 of Figure 1.

Figure 5 is a cross sectional view on the line 5—5 of Figure 1.

Figure 6 is a cross sectional view on the line 6—6 of Figure 1.

Figure 7 is a perspective view of the clamping means for holding the hose showing the parts separated.

Figure 8 is a perspective view of the adjustable means for securing the clamping device in position.

Figure 9 shows a modification of the clamping device.

The device comprehends a base board 1 of suitable size. Upon this baseboard are two parallel metal brackets 2, 2, spaced apart a suitable distance. The upright portions of these brackets are at substantially right angles to the baseboard 1 and are slightly flexible. A second baseboard member 3 is positioned snugly between the two brackets 2 and is firmly secured to the first base member 1 by fastening means 4. The two base members form a T-shaped base for the device.

The arm 5 is pivoted between the brackets 2—2 to swing vertically. To the arm 5 at its lower end, a block 6 is fastened by suitable fastening means 7. Between the pieces 6 and 7 a bearing 8 is cut, half of the bearing being cut into each of the pieces 5 and 6. A bolt 9 passes through openings 8a suitably placed in the brackets 2 and through the bearing 8, and this bolt serves as a pivot upon which the arm 5 may be turned. A wing nut 10 is threaded upon the bolt 9 and by tightening the nut 10 the brackets 2 may be brought towards each other to clamp against the respective edges of the arm 5, to hold it securely in the desired position. Washers 11, are interposed between the nut 10 and the brackets, and between the head of the bolt 9 and the bracket 2.

It will be seen that upon loosening the wing nut 10, the arm 5 may be moved on the pivot bolt 9 and secured at any angle of inclination by again tightening the nut 10.

A V-shaped notch 12 is cut into the upper end of the swinging arm 5. The hose 13 passes through this notch so that the nozzle 14 is just beyond the notch. It is the hose 13 and not the nozzle 14 which is held in the notch 12.

A yoke 15 having legs 16 embraces one edge of the arm 5. These legs, as shown in Figure 7, consist in part of short sections of chain 18, covered by suitable flexible material 19, such as rubber tubing. To the ends of the chain members 18 are attached links 20. A bolt 21 passes through the arm at one side of the notch 12, and upon this bolt the links 20 are mounted so that the yoke 15 may swing across the notch 12 in such a manner as to press the hose into the notch and to hold it there.

A modification of the holding device is shown in Figure 9. In this modification the legs 16a of the yoke are extended to a sufficient length to permit their being pivoted upon the bolt 21 at the opposite side of the notch 12. The free ends of the legs 16a are bent to form eyes 22 through which the bolt 21 passes. The legs 16a are suitably covered as at 19a to prevent injury to the hose.

Washers 23 are placed between the links 20 and arm 5 and between links 20 and the head of the bolt 21 on one side, and the nut 24 on the other. The nut 24 is screwed on to the end of the bolt 21. At the center of yoke 15, a loop or eye 25 is formed. A link 26 engages in this loop and a coiled spring 27 engages the link 26. To the opposite end of the coiled spring 27 is secured a link 28 which engages a stud member 29 adjustably mounted upon the arm 5.

This arm 29 is carried by an elongated loop 30 secured to the underside of the arm 5 at a distance from the notch 12. One side of this loop is extended and offset as at 31, Figure 8, to pass around the edge of the arm 5, and is so bent that the end thereof stands out from the edge of the arm 5, forming the stud 29.

A clamping plate member 32 is held on the underside of the arm 5 by a bolt 33 and nut 34, and this clamp plate 32 holds the loop 30 to the underside of the arm 5. By loosening the nut 34, the loop 30 may be moved longitudinally of the arm to regulate the tension of the spring 27.

To use the device the hose is placed in the notch 12 as shown in Figure 1, and the yoke member 15 is swung across the notch, firmly holding the hose. Link 28 is then slipped onto the stud 29. The effect is that the hose is securely held in the notch 12 through the spring 27 and yoke 15. The arm 5 may be swung on its pivot 9 to give the desired angle to the stream discharged from the nozzle, the wing nut 10 is then tightened, securely clamping the arm 5 in its adjusted position between the brackets 2—2.

From the foregoing, it is thought that the construction, operation and many advantages of the herein described invention will be apparent to those skilled in the art without further description and it will be understood that various changes in the size, shape, proportion and minor details of construction may be resorted to without departing from the spirit or sacrificing any of the advantages of the invention.

What I claim is:

1. A support for a garden hose comprising a base board, upstanding brackets secured to the base board, an upstanding arm secured between the brackets, hose holding means on the arm, and a second base board secured to the first baseboard between the two upstanding brackets and below the end of the upstanding arm.

2. A holder for garden hose comprising a base board, a second base board secured to the first base board at a right angle thereto, upstanding brackets attached to the first base board at opposite edges of the second base board and an upstanding arm clamped between the spaced brackets, and hose holding means on the arm.

3. A holder for a garden hose comprising a base, an upstanding arm pivoted to the base, a notch in the free end of the arm, a yoke embracing the free end of the arm, the legs of the yoke being pivoted to the arm at one side of the notch, an eye at the other end of the yoke, a flexible yielding member attached to the eye, and an adjustable stud mounted upon the arm to which the flexible member is fastened.

In testimony whereof, I affix my signature.

RICHARD W. HEMPEL.